(12) United States Patent
Kim et al.

(10) Patent No.: US 11,046,322 B2
(45) Date of Patent: Jun. 29, 2021

(54) APPARATUS AND METHOD FOR PROVIDING SAFETY STRATEGY IN VEHICLE

(71) Applicants: Hyundai Motor Company, Seoul (KR); KIA Motors Corporation, Seoul (KR)

(72) Inventors: Hyun Ju Kim, Gyeonggi-do (KR); Jae Yong Jeon, Gyeonggi-do (KR); Dong Hwi Lee, Gyeonggi-do (KR); Jin Su Jeong, Gyeonggi-do (KR); Su Jung Yoo, Incheon (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 212 days.

(21) Appl. No.: 16/372,937

(22) Filed: Apr. 2, 2019

(65) Prior Publication Data

US 2019/0315364 A1    Oct. 17, 2019

Related U.S. Application Data

(60) Provisional application No. 62/655,831, filed on Apr. 11, 2018.

(30) Foreign Application Priority Data

Nov. 20, 2018    (KR) .................. 10-2018-0143881

(51) Int. Cl.
   *B60W 30/18*    (2012.01)
   *B60W 50/00*    (2006.01)
(52) U.S. Cl.
   CPC .. *B60W 30/18163* (2013.01); *B60W 50/0098* (2013.01); *B60W 2520/10* (2013.01); *B60W 2552/00* (2020.02); *B60W 2554/804* (2020.02)

(58) Field of Classification Search
   CPC ....... B60W 30/18163; B60W 50/0098; B60W 2552/00; B60W 2554/804;
   (Continued)

(56) References Cited

U.S. PATENT DOCUMENTS 5,521,579 A    5/1996   Bernhard
6,055,467 A    4/2000   Mehring et al.
(Continued)

FOREIGN PATENT DOCUMENTS

DE    198 21 122 A1    6/1999
DE    101 14 187 A1    9/2002
(Continued)

OTHER PUBLICATIONS

European Search Report dated Mar. 27, 2020 from the corresponding European Application No. 19167264.1, 8 pages.
(Continued)

*Primary Examiner* — Richard M Camby
(74) *Attorney, Agent, or Firm* — Brinks Gilson & Lione (57) ABSTRACT

An apparatus for providing a safety strategy in a vehicle is provided. The apparatus includes a sensor configured to sense information about the outside of the vehicle, a memory storing road information, and a control circuit configured to be electrically connected with the sensor and the memory. The control circuit generates a route which is toward a shoulder included in a road where the vehicle is traveling, when a control authority transition demand of the vehicle is ignored, adjusts an operational condition of an automatic lane change based on at least a portion of a speed of the vehicle, a speed of a following vehicle in a target lane of the route, or a distance between the vehicle and the following vehicle, and performs the automatic lane change toward the shoulder along the route, when the adjusted operational condition is satisfied.

20 Claims, 9 Drawing Sheets

(58) Field of Classification Search
CPC ..... B60W 2520/10; B60W 2040/0818; B60W 2040/0872; B60W 2050/0095; B60W 2554/801; B60W 50/085; B60W 50/087; B60W 40/105; B60W 2550/308; G05D 1/0061

See application file for complete search history.

(56) References Cited

U.S. PATENT DOCUMENTS

| | | | |
|---|---|---|---|
| 6,473,678 | B1 | 10/2002 | Satoh et al. |
| 6,842,687 | B2 | 1/2005 | Winner et al. |
| 7,363,140 | B2 | 4/2008 | Ewerhart et al. |
| 7,821,421 | B2 | 10/2010 | Tamir et al. |
| 8,073,595 | B2 | 12/2011 | Tabata et al. |
| 8,521,352 | B1 | 8/2013 | Ferguson et al. |
| 8,798,841 | B1 * | 8/2014 | Nickolaou ......... B62D 15/0265 701/23 |
| 8,874,301 | B1 * | 10/2014 | Rao .................. B60K 28/04 701/25 |
| 9,315,178 | B1 * | 4/2016 | Ferguson ............. B60W 30/16 |
| 9,527,441 | B2 | 12/2016 | Matsumura |
| 9,874,871 | B1 | 1/2018 | Zhu et al. |
| 10,183,668 | B2 | 1/2019 | Takae |
| 10,449,856 | B2 | 10/2019 | Kojima |
| 10,451,730 | B2 | 10/2019 | Talamonti et al. |
| 10,558,213 | B2 | 2/2020 | Sato et al. |
| 10,627,813 | B2 | 4/2020 | Tsuji et al. |
| 10,663,971 | B2 | 5/2020 | Sugawara et al. |
| 10,676,084 | B2 | 6/2020 | Fujii |
| 10,814,913 | B2 | 10/2020 | Fujii |
| 2003/0163239 | A1 | 8/2003 | Winner et al. |
| 2005/0137782 | A1 | 6/2005 | Shinada |
| 2005/0228588 | A1 | 10/2005 | Braeuchle et al. |
| 2005/0256630 | A1 | 11/2005 | Nishira et al. |
| 2006/0009910 | A1 | 1/2006 | Ewerhart et al. |
| 2007/0043505 | A1 | 2/2007 | Leicht |
| 2007/0255474 | A1 | 11/2007 | Hayakawa et al. |
| 2008/0172153 | A1 | 7/2008 | Ozaki et al. |
| 2008/0204212 | A1 | 8/2008 | Jordan et al. |
| 2009/0005933 | A1 | 1/2009 | Tabata et al. |
| 2009/0088925 | A1 | 4/2009 | Sugawara et al. |
| 2009/0132125 | A1 | 5/2009 | Yonezawa et al. |
| 2009/0171533 | A1 | 7/2009 | Kataoka |
| 2009/0194350 | A1 | 8/2009 | Rattapon et al. |
| 2009/0299573 | A1 | 12/2009 | Thrun et al. |
| 2009/0319113 | A1 | 12/2009 | Lee |
| 2010/0010733 | A1 | 1/2010 | Krumm |
| 2010/0042282 | A1 | 2/2010 | Taguchi et al. |
| 2010/0289632 | A1 | 11/2010 | Seder et al. |
| 2011/0169625 | A1 | 7/2011 | James et al. |
| 2011/0196592 | A1 | 8/2011 | Kashi et al. |
| 2011/0241862 | A1 | 10/2011 | Debouk et al. |
| 2011/0251758 | A1 | 10/2011 | Kataoka |
| 2011/0293145 | A1 | 12/2011 | Nogami et al. |
| 2012/0166032 | A1 | 6/2012 | Lee et al. |
| 2012/0296522 | A1 | 11/2012 | Otuka |
| 2013/0063595 | A1 | 3/2013 | Niem |
| 2013/0066525 | A1 * | 3/2013 | Tomik .................. B60R 25/04 701/45 |
| 2013/0226406 | A1 | 8/2013 | Ueda et al. |
| 2014/0074356 | A1 | 3/2014 | Bone |
| 2015/0006012 | A1 | 1/2015 | Kammel et al. |
| 2015/0006013 | A1 | 1/2015 | Wimmer et al. |
| 2015/0019063 | A1 | 1/2015 | Lu et al. |
| 2015/0094899 | A1 | 4/2015 | Hackenberg et al. |
| 2015/0148985 | A1 | 5/2015 | Jo |
| 2015/0166062 | A1 | 6/2015 | Johnson et al. |
| 2015/0204687 | A1 | 7/2015 | Yoon et al. |
| 2015/0353082 | A1 | 12/2015 | Lee et al. |
| 2015/0355641 | A1 | 12/2015 | Choi et al. |
| 2015/0360721 | A1 | 12/2015 | Matsuno et al. |
| 2016/0001781 | A1 | 1/2016 | Fung et al. |
| 2016/0091897 | A1 | 3/2016 | Nilsson et al. |
| 2016/0107682 | A1 | 4/2016 | Tan et al. |
| 2016/0107687 | A1 | 4/2016 | Yamaoka |
| 2016/0187879 | A1 | 6/2016 | Mere et al. |
| 2016/0225261 | A1 | 8/2016 | Matsumoto |
| 2016/0250968 | A1 | 9/2016 | Shirakata et al. |
| 2016/0272204 | A1 | 9/2016 | Takahashi et al. |
| 2016/0288707 | A1 | 10/2016 | Matsumura |
| 2016/0297431 | A1 | 10/2016 | Eigel et al. |
| 2016/0339913 | A1 | 11/2016 | Yamashita et al. |
| 2016/0349066 | A1 | 12/2016 | Chung et al. |
| 2016/0368492 | A1 | 12/2016 | Al-Stouhi |
| 2017/0003683 | A1 | 1/2017 | Sato et al. |
| 2017/0061799 | A1 | 3/2017 | Fujii et al. |
| 2017/0108865 | A1 | 4/2017 | Rohde et al. |
| 2017/0124882 | A1 | 5/2017 | Wang |
| 2017/0171375 | A1 | 6/2017 | Kamata |
| 2017/0197637 | A1 | 7/2017 | Yamada et al. |
| 2017/0203763 | A1 | 7/2017 | Yamada et al. |
| 2017/0203764 | A1 | 7/2017 | Fujiki et al. |
| 2017/0240172 | A1 | 8/2017 | Nishiguchi et al. |
| 2017/0240186 | A1 | 8/2017 | Hatano |
| 2017/0243491 | A1 | 8/2017 | Fujii et al. |
| 2017/0291603 | A1 | 10/2017 | Nakamura |
| 2017/0313313 | A1 | 11/2017 | Asakura |
| 2017/0315556 | A1 | 11/2017 | Mimura |
| 2017/0334460 | A1 | 11/2017 | Arakawa et al. |
| 2017/0341652 | A1 | 11/2017 | Sugawara et al. |
| 2017/0341653 | A1 | 11/2017 | Kubota et al. |
| 2017/0349212 | A1 | 12/2017 | Oshida et al. |
| 2017/0368936 | A1 | 12/2017 | Kojima |
| 2018/0009437 | A1 | 1/2018 | Ooba |
| 2018/0029604 | A1 | 2/2018 | Niino et al. |
| 2018/0033309 | A1 | 2/2018 | Norwood |
| 2018/0043906 | A1 | 2/2018 | Huang |
| 2018/0046185 | A1 | 2/2018 | Sato et al. |
| 2018/0050659 | A1 | 2/2018 | Coburn |
| 2018/0074497 | A1 | 3/2018 | Tsuji et al. |
| 2018/0088574 | A1 | 3/2018 | Latotzki et al. |
| 2018/0091085 | A1 | 3/2018 | Tamagaki et al. |
| 2018/0111628 | A1 | 4/2018 | Tamagaki et al. |
| 2018/0154939 | A1 | 6/2018 | Aoki |
| 2018/0157038 | A1 | 6/2018 | Kabe |
| 2018/0162416 | A1 | 6/2018 | Honda et al. |
| 2018/0170370 | A1 | 6/2018 | Kataoka |
| 2018/0178713 | A1 | 6/2018 | Fujii |
| 2018/0178714 | A1 | 6/2018 | Fujii |
| 2018/0178715 | A1 | 6/2018 | Fujii |
| 2018/0178716 | A1 | 6/2018 | Fujii |
| 2018/0178802 | A1 | 6/2018 | Miyata |
| 2018/0186376 | A1 | 7/2018 | Lee et al. |
| 2018/0194280 | A1 | 7/2018 | Shibata et al. |
| 2018/0197414 | A1 | 7/2018 | Oooka |
| 2018/0209801 | A1 | 7/2018 | Stentz et al. |
| 2018/0215387 | A1 | 8/2018 | Takae |
| 2018/0222422 | A1 | 8/2018 | Takae |
| 2018/0222423 | A1 | 8/2018 | Takae et al. |
| 2018/0237030 | A1 | 8/2018 | Jones et al. |
| 2018/0239352 | A1 | 8/2018 | Wang et al. |
| 2018/0251155 | A1 | 9/2018 | Chan et al. |
| 2018/0281788 | A1 | 10/2018 | Uchida |
| 2018/0290666 | A1 | 10/2018 | Ichikawa et al. |
| 2018/0292820 | A1 | 10/2018 | Markberger |
| 2018/0297638 | A1 | 10/2018 | Fujii |
| 2018/0297639 | A1 | 10/2018 | Fujii |
| 2018/0297640 | A1 | 10/2018 | Fujii |
| 2018/0339708 | A1 | 11/2018 | Geller |
| 2018/0345959 | A1 | 12/2018 | Fujii |
| 2018/0345960 | A1 | 12/2018 | Fujii |
| 2018/0345964 | A1 | 12/2018 | Fujii et al. |
| 2018/0346027 | A1 | 12/2018 | Fujii |
| 2018/0348758 | A1 | 12/2018 | Nakamura et al. |
| 2018/0350242 | A1 | 12/2018 | Fujii |
| 2018/0354519 | A1 | 12/2018 | Miyata |
| 2018/0362013 | A1 | 12/2018 | Ungermann |
| 2018/0370542 | A1 | 12/2018 | Braunagel et al. |
| 2018/0370544 | A1 | 12/2018 | Kitagawa |
| 2018/0373250 | A1 | 12/2018 | Nakamura et al. |
| 2019/0005823 | A1 | 1/2019 | Fujiki et al. |
| 2019/0026918 | A1 | 1/2019 | Gomezcaballero et al. |
| 2019/0061766 | A1 | 2/2019 | Nishiguchi |

(56) References Cited

U.S. PATENT DOCUMENTS

| | | |
|---|---|---|
| 2019/0071099 A1 | 3/2019 | Nishiguchi |
| 2019/0126923 A1 | 5/2019 | Taie et al. |
| 2019/0135290 A1 | 5/2019 | Marden et al. |
| 2019/0155279 A1 | 5/2019 | Tayama |
| 2019/0161117 A1 | 5/2019 | Suzuki |
| 2019/0185005 A1 | 6/2019 | Fukuda |
| 2019/0235504 A1 | 8/2019 | Carter et al. |
| 2019/0241198 A1 | 8/2019 | Mori et al. |
| 2019/0256064 A1 | 8/2019 | Hecker et al. |
| 2019/0263411 A1 | 8/2019 | Saikyo et al. |
| 2019/0265712 A1 | 8/2019 | Satzoda et al. |
| 2019/0279507 A1 | 9/2019 | Oshisaka et al. |
| 2019/0283757 A1 | 9/2019 | Honda et al. |
| 2019/0291728 A1 | 9/2019 | Shalev-Shwartz et al. |
| 2019/0302768 A1 | 10/2019 | Zhang et al. |
| 2019/0315362 A1 | 10/2019 | Um et al. |
| 2019/0317494 A1 | 10/2019 | Lee et al. |
| 2019/0325758 A1 | 10/2019 | Yoshii et al. |
| 2019/0359202 A1 | 11/2019 | Zhu et al. |
| 2019/0391580 A1 | 12/2019 | Di Cairano et al. |
| 2020/0001714 A1 | 1/2020 | Kojima |
| 2020/0073396 A1 | 3/2020 | Shimizu |
| 2020/0172123 A1 | 6/2020 | Kubota et al. |
| 2020/0180638 A1 | 6/2020 | Kanoh |
| 2020/0269747 A1 | 8/2020 | Kusayanagi et al. |
| 2020/0269880 A1 | 8/2020 | Tokita |
| 2020/0301431 A1 | 9/2020 | Matsubara et al. |
| 2020/0307634 A1 | 10/2020 | Yashiro |
| 2020/0312155 A1 | 10/2020 | Kelkar et al. |
| 2020/0391593 A1 | 12/2020 | Lee et al. |

FOREIGN PATENT DOCUMENTS

| | | |
|---|---|---|
| DE | 102004005815 B3 | 6/2005 |
| DE | 10 2004 048 468 A1 | 4/2006 |
| DE | 10 2007 005 245 A1 | 11/2007 |
| DE | 10 2011 016 770 A1 | 11/2011 |
| DE | 10 2011 016 771 A1 | 10/2012 |
| DE | 10 2012 001405 A1 | 11/2012 |
| DE | 10 2011 109618 A1 | 2/2013 |
| DE | 10 2012 008090 A1 | 10/2013 |
| DE | 10 2014 225 680 A1 | 6/2016 |
| DE | 10 2015 205131 A1 | 9/2016 |
| DE | 102016202946 A1 | 9/2016 |
| DE | 102015206969 A1 | 10/2016 |
| DE | 102015209476 A1 | 11/2016 |
| DE | 102015219231 A1 | 4/2017 |
| DE | 10 2016 007 187 A1 | 6/2017 |
| DE | 102015224244 A1 | 6/2017 |
| DE | 10 2016 215565 A1 | 2/2018 |
| DE | 10 2016 216134 A1 | 3/2018 |
| EP | 1074904 A1 | 2/2001 |
| EP | 1607264 A1 | 12/2005 |
| EP | 2116984 A1 | 11/2009 |
| EP | 2657921 A1 | 10/2013 |
| EP | 2978648 A1 | 2/2016 |
| EP | 3075618 A2 | 10/2016 |
| EP | 3239960 A1 | 11/2017 |
| EP | 3 264 211 A1 | 1/2018 |
| EP | 3284646 A1 | 2/2018 |
| EP | 3075618 A3 | 5/2018 |
| JP | 2000-198458 A | 7/2000 |
| JP | 2003-025868 A | 1/2003 |
| JP | 2015-138330 A | 7/2015 |
| JP | 2016-000602 A | 1/2016 |
| JP | 2016-151815 A | 8/2016 |
| JP | 2016-196285 A | 11/2016 |
| JP | 2019-043169 A | 3/2019 |
| KR | 100578573 B2 | 5/2006 |
| KR | 101779823 B1 | 10/2017 |
| KR | 20180070401 A | 6/2018 |
| WO | WO 2010-088869 A1 | 8/2010 |
| WO | WO 2012-131405 A1 | 10/2012 |
| WO | WO 2014-154771 A1 | 10/2014 |
| WO | WO 2017-018133 A1 | 2/2017 |
| WO | WO 2017064941 A1 | 4/2017 |
| WO | WO 2017-168013 A1 | 10/2017 |
| WO | WO 2017168013 A1 | 10/2017 |
| WO | WO 2018-033389 A1 | 2/2018 |
| WO | WO 2017-017793 A1 | 6/2018 |

OTHER PUBLICATIONS

European Search Report dated Apr. 21, 2020 from the corresponding European Application No. 19167270.8, 8 pages.
U.S. Office Action dated Feb. 4, 2020 from the corresponding U.S. Appl. No. 16/296,890, 19 pp.
U.S. Office Action dated Mar. 25, 2020 from the corresponding U.S. Appl. No. 16/204,362 , 27 pp.
U.S. Office Action dated Apr. 24, 2020 from the corresponding U.S. Appl. No. 16/203,884 , 25 pp.
Office Action dated Aug. 12, 2020 from the corresponding U.S. Appl. No. 16/192,279, 60 pages.
Notice of Allowance dated Sep. 4, 2020 from the corresponding U.S. Appl. No. 16/203,884, 15 pages.
Office Action dated Sep. 15, 2020 from the corresponding U.S. Appl. No. 16/206,170, 23 pages.
European Search Report dated Jul. 1, 2019 from the corresponding European Application No. 18210398.6, 9 pages.
European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.
European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.
European Search Report dated Aug. 30, 2019 from the corresponding European Application No. 19167269.0, 9 pages.
European Search Report dated Aug. 30, 2019 from the corresponding European Application No. 19167267.4, 8 pages.
European Search Report dated May 11, 2020 from the corresponding European Application No. 19167265.8, 9 pages.
Office Action for U.S. Appl. No. 16/204,400 dated Jun. 1, 2020, 44 pages.
Notice of Allowance for U.S. Appl. No. 16/204,362 dated Jul. 9, 2020, 21 pages.
European Search Report dated Oct. 2, 2019 from the corresponding European Application No. 19163402.1, 10 pages.
European Search Report dated Oct. 2, 2019 from the corresponding European Application No. 19162795.9, 8 pages.
European Search Report dated Oct. 14, 2019 from the corresponding European Application No. 19161253.0, 11 pages.
European Search Report dated Oct. 18, 2019 from the corresponding European Application No. 19167268.2, 8 pages.
European Search Report dated Oct. 23, 2019 from the corresponding European Application No. 19167266.6, 9 pages.
U.S. Office Action for U.S. Appl. No. 16/204,362 dated Oct. 16, 2019, 32 pages.
Office Action dated Dec. 10, 2020 from the corresponding U.S. Appl. No. 16/269,140, 31 pp.
Office Action dated Dec. 14, 2020 from the corresponding U.S. Appl. No. 16/378,203, 49 pp.
Notice of Allowance dated Dec. 28, 2020 from the corresponding U.S. Appl. No. 16/206,170, 16 pp.
Office Action dated Jan. 25, 2021 from the corresponding U.S. Appl. No. 16/192,279, 38 pp.
Office Action dated Jan. 27, 2021 from the corresponding U.S. Appl. No. 16/299,547, 29 pp.

(56) References Cited

OTHER PUBLICATIONS

Office Action dated Feb. 11, 2021 from the corresponding U.S. Appl. No. 16/372,896, 26 pp.
Office Action dated Feb. 11, 2021 from the corresponding U.S. Appl. No. 16/376,661, 24 pp.
Office Action dated Feb. 17, 2021 from the corresponding U.S. Appl. No. 16/204,324, 30 pp.
Office Action dated Feb. 17, 2021 from the corresponding U.S. Appl. No. 16/376,576, 56 pp.
U.S. Office Action for U.S. Appl. No. 16/378,181 dated Mar. 17, 2021 (14 pages).
U.S. Office Action for U.S. Appl. No. 16/376,612 dated Mar. 26, 2021 (29 pages).
U.S. Office Action for U.S. Appl. No. 16/290,376 dated Apr. 15, 2021 (27 pages).
U.S. Notice of Allowance for U.S. Appl. No. 16/269,140 dated Mar. 23, 2021 (9 pgs).
U.S. Appl. No. 16/378,203 Final Office Action dated Apr. 22, 2021, 35 pgs.
U.S. Appl. No. 16/204,324 Notice of Allowance dated May 19, 2021, 13 pgs.
U.S. Appl. No. 16/372,896 Non-Final Office Action dated May 21, 2021, 19 pgs.

* cited by examiner

APPARATUS AND METHOD FOR PROVIDING SAFETY STRATEGY IN VEHICLE

CROSS-REFERENCE TO RELATED APPLICATION

This application claims the benefit of and priority to Korean Patent Application No. 10-2018-0143881, filed on Nov. 20, 2018, which claims priority to and the benefit of U.S. Provisional Patent Application No. 62/655,831, filed on Apr. 11, 2018, the entire contents of both of which are incorporated herein by reference.

FIELD

The present disclosure relates to an apparatus and method for providing a strategy for the maintenance of safety depending on a state of a driver of a vehicle.

BACKGROUND

The statements in this section merely provide background information related to the present disclosure and may not constitute prior art.

With the development of the auto industry, an autonomous system and a driving assistance system which facilitates partially autonomous driving (hereinafter, for convenience of description, both of autonomous driving and driving assistance are referred to as "autonomous driving") have been developed. The autonomous system may provide a variety of functions, for example, setting speed keeping, vehicle-to-vehicle distance keeping, lane keeping, and a lane change. The autonomous system may perform autonomous driving using various devices such as a sensor for sensing environments outside the vehicle, a sensor for sensing information about the vehicle, a global positioning system (GPS), a detailed map, a driver state monitoring system, a steering actuator, an acceleration/deceleration actuator, a communication circuit, and a control circuit (e.g., an electronic control unit (ECU)). The autonomous system may monitor a state of a driver and may provide a suitable minimum risk maneuver (MRM) depending on the state of the driver.

It may be difficult to provide for the safety of the driver, when an MRM is provided, when speed and lane keeping control is performed in a lane where the vehicle is traveling, or when deceleration or stopping is controlled. Thus, a system capable of providing an automatic lane change function may provide a strategy capable of increasing the safety of the driver through a lane change. To perform an automatic lane change, a specified operational condition (e.g., a speed of the vehicle and a distance between the vehicle and a following vehicle) should be satisfied. However, it may be difficult to meet the specified operational condition in a critical situation.

SUMMARY

An aspect of the present disclosure provides an apparatus and method for providing a safety strategy for providing for the safety of a driver by suitably adjusting an operational condition of an automatic lane change.

According to an aspect of the present disclosure, an apparatus for providing a safety strategy in a vehicle may include: a sensor configured to sense information about the outside of the vehicle, a memory storing road information, and a control circuit configured to be electrically connected with the sensor and the memory. The control circuit may be configured to generate a route which is toward a shoulder included in a road where the vehicle is traveling, when a transition demand of the vehicle is ignored, adjust an operational condition of an automatic lane change based on at least a portion of a speed of the vehicle, a speed of a following vehicle which is traveling in a target lane of the route, or a distance between the vehicle and the following vehicle, and perform the automatic lane change toward the shoulder along the route, when the adjusted operational condition is satisfied.

According to one aspect, the control circuit may be configured to generate the route, when a driver of the vehicle does not respond to the transition demand during a specified time interval after the transition demand occurs.

According to one aspect, the control circuit may be configured to determine whether the shoulder is included in the road where the vehicle is traveling, based on the road information and generate the route, when the shoulder is included in the road where the vehicle is traveling.

According to one aspect, the control circuit may be configured to control stopping in a lane where the vehicle is traveling, when the shoulder is not included in the road where the vehicle is traveling.

According to one aspect, the control circuit may be configured to control stopping in the shoulder, when the vehicle enters the shoulder.

According to one aspect, the operational condition may include a sensor sensing distance condition, an operational distance condition, and an operational speed condition.

According to one aspect, the control circuit may be configured to adjust the operational condition to determine that the sensor sensing distance condition is satisfied when the following vehicle is sensed by the sensor.

According to one aspect, the operational distance condition may be adjusted based on a speed of the vehicle and a relative speed between the vehicle and the following vehicle.

According to one aspect, the operational speed condition may be adjusted based on a speed of the following vehicle and a distance between the vehicle and the following vehicle.

According to one aspect, the control circuit may be configured to adjust the operational condition, when a predetermined operational condition is not satisfied.

According to one aspect, the control circuit may be configured to calculate an expected time taken to enter the shoulder and adjust the operational condition, when the expected time is longer than a specified time.

According to another aspect of the present disclosure, a method for providing a safety strategy in a vehicle may include: generating a route which is toward a shoulder included in a road where the vehicle is traveling, when a transition demand of the vehicle is ignored, adjusting an operational condition of an automatic lane change based on at least a portion of a speed of the vehicle, a speed of a following vehicle which is traveling in a target lane of the route, or a distance between the vehicle and the following vehicle, and performing the automatic lane change toward the shoulder along the route, when the adjusted operational condition is satisfied.

According to one aspect, the generating may include generating the route, when a driver of the vehicle does not respond to the transition demand during a specified time interval after the transition demand occurs.

According to one aspect, the generating may include determining whether the shoulder is included in the road where the vehicle is traveling, based on the road information and generating the route, when the shoulder is included in the road where the vehicle is traveling.

According to one aspect, the method may further include controlling stopping in a lane where the vehicle is traveling, when the shoulder is not included in the road where the vehicle is traveling.

According to one aspect, the method may further include controlling stopping in the shoulder, when the vehicle enters the shoulder.

According to one aspect, the operational condition may include a sensor sensing distance condition, an operational distance condition, and an operational speed condition.

According to one aspect, the adjusting may include adjusting the operational condition to determine that the sensor sensing distance condition is satisfied when the following vehicle is sensed by a sensor of the vehicle.

According to one aspect, the operational distance condition may be adjusted based on a speed of the vehicle and a relative speed between the vehicle and the following vehicle.

According to one aspect, the operational speed condition may be adjusted based on a speed of the following vehicle and a distance between the vehicle and the following vehicle.

According to one aspect, the adjusting may include adjusting the operational condition, when a predetermined operational condition is not satisfied.

According to one aspect, the adjusting may include calculating an expected time taken to enter the shoulder and adjusting the operational condition, when the expected time is longer than a specified time.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, the present disclosure will be described in detail with reference to the accompanying drawings. In adding reference denotations to elements of each drawing, although the same elements are displayed on a different drawing, it should be noted that the same elements have the same denotations. In addition, in describing one aspect of the present disclosure, if it is determined that a detailed description of related well-known configurations or functions blurs the gist of one aspect of the present disclosure, it will be omitted.

In describing elements of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
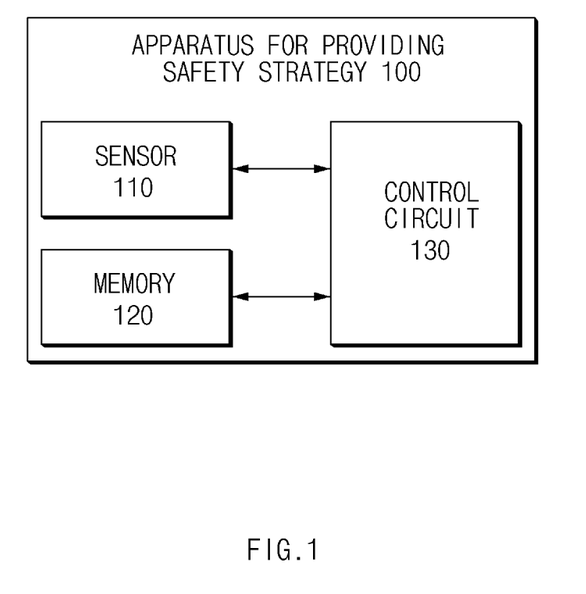
FIG. 1 is a block diagram illustrating a configuration of an apparatus for providing a safety strategy in a vehicle according to one aspect of the present disclosure.

FIG. 1 is a block diagram illustrating a configuration of an apparatus for providing a safety strategy in a vehicle according to one aspect of the present disclosure.

Referring to FIG. 1, an apparatus 100 for providing a safety strategy according to one aspect may include a sensor 110, a memory 120, and a control circuit 130. The apparatus 100 for providing the safety strategy in FIG. 1 may be a portion of an autonomous system and may be loaded into the vehicle.

The sensor 110 may sense information about the outside of the vehicle. For example, the sensor 110 may sense information (e.g., a location, a speed, acceleration, and the like) associated with a following vehicle which is traveling on a lane neighboring to a lane where the vehicle is traveling. The sensor 110 may sense a speed of the vehicle.

The memory 120 may store road information. The road information may include, for example, a map or the like. The road information may include information about whether the road where the vehicle is traveling includes a shoulder.

The control circuit 140 may be electrically connected with the sensor 110 and the memory 120. The control circuit 140 may control the sensor 110 and the memory 120 and may perform a variety of data processing and various arithmetic operations. The control circuit 140 may be, for example, an electronic control unit (ECU), a micro controller unit (MCU), or a sub-controller, which is loaded into the vehicle.

According to one aspect, the control circuit 140 may provide a transition demand of the vehicle to a driver of the vehicle. For example, the control circuit 140 may output the transition demand using an output device (not shown).

The transition demand may be ignored by the driver. For example, when the driver of the vehicle does not respond to the transition demand during a specified time interval after the transition demand occurs, the control circuit 130 may determine that the transition demand is ignored.

According to one aspect, when the transition demand is ignored, the control circuit 130 may generate a route which is toward a shoulder included in the road where the vehicle is traveling. When the transition demand is ignored, the control circuit 130 may execute a minimum risk maneuver (MRM) for the safety of the driver. As one of the MRMs, the control circuit 130 may execute a strategy for stopping the vehicle or a strategy for moving the vehicle to a shoulder. When the strategy for moving the vehicle to the shoulder is executed, the control circuit 130 may generate a route which is toward the shoulder.

According to one aspect, the control circuit 130 may determine whether a shoulder is included in a road where the vehicle is traveling, based on road information. When the shoulder is included in the road where the vehicle is traveling, the control circuit 130 may generate a route which is toward the shoulder. The control circuit 130 may determine whether there is a shoulder using the road information stored in the memory 120 and may execute a strategy for moving the vehicle to the shoulder. According to one aspect, when the shoulder is not included in the road where the vehicle is traveling, the control circuit 130 may control stopping in the road where the vehicle is traveling.

According to one aspect, the control circuit 130 may adjust an operational condition of an automatic lane change at least a portion of a speed of the vehicle, a speed of a following vehicle which is traveling in a target lane of a route, or a distance between the vehicle and the following vehicle. The operational condition may include, for example, a sensor sensing distance condition, an operational distance condition, and an operational speed condition. The operational condition may be preset. The predetermined operational condition may be difficult to be satisfied in an MRM situation. Thus, the control circuit 130 may move the vehicle to the shoulder using an automatic lane change in the MRM situation by adjusting the operational condition. For example, when a distance sensible by the sensor 110 is greater than or equal to 55 m, the predetermined sensor sensing distance condition may be satisfied. For example, the control circuit 130 may determine that the sensor sensing distance condition is met when a following vehicle is sensed by the sensor 110 by adjusting the predetermined sensor sensing distance condition. The operational distance condition may be adjusted based on, for example, a speed of the vehicle and a relative speed between the vehicle and the following vehicle. The operational speed condition may be adjusted based on, for example, a speed of the following vehicle and a distance between the vehicle and the following vehicle. A description will be given in detail of the adjustment of the operational distance condition and the operational speed condition with reference to FIGS. 4 and 5. The control circuit 130 may adjust the operational condition based on the information collected by the sensor 110.

According to one aspect, when the predetermined operational condition is not satisfied, the control circuit 130 may adjust an operational condition. When the strategy for moving the vehicle to the shoulder is selected, but when the predetermined operational condition is not satisfied, the control circuit 130 may mitigate the operational condition to execute the strategy.

According to one aspect, the control circuit 130 may calculate an expected time taken to enter the shoulder and may adjust an operational condition when the expected time is longer than a specified time. The control circuit 130 may calculate an expected time taken to enter the shoulder, based on the generated route and the information collected by the sensor 110. When the expected time is longer than the specified time due to a speed of the vehicle, a speed of the following vehicle, and/or the approaching following vehicle, the control circuit 130 may shorten a time taken to enter the shoulder, by mitigating the operational condition.

According to one aspect, when the adjusted operational condition is satisfied, the control circuit 130 may perform an automatic lane change toward the shoulder along the route. When the vehicle enters the shoulder, the control circuit 130 may control stopping in the shoulder.

As described above, the apparatus for providing the safety strategy in the vehicle may effectively execute the MRM by mitigating the operational condition of the automatic lane change when executing the MRM.

Figure 2:
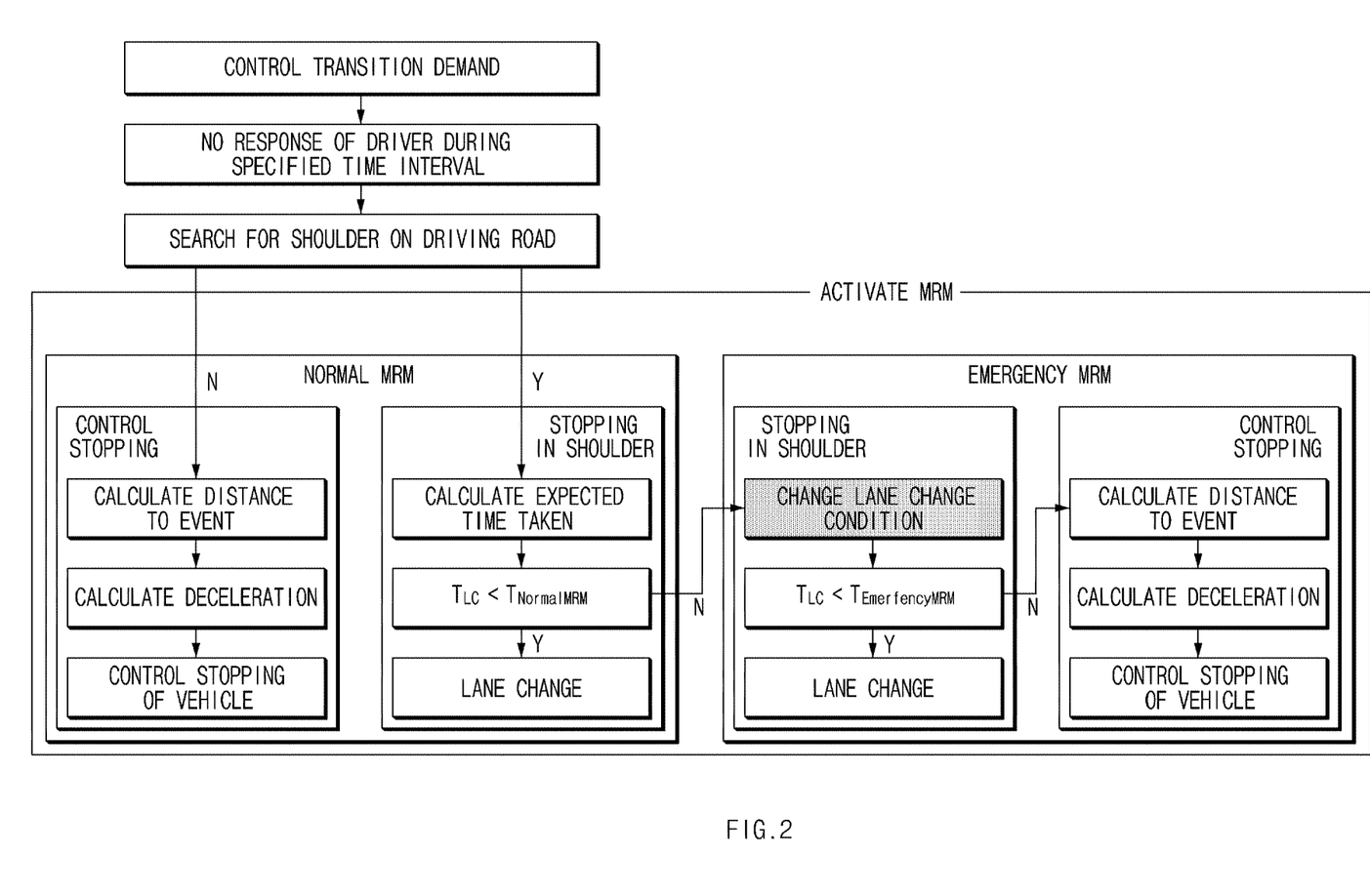
FIG. 2 is a drawing illustrating an exemplary operation of an apparatus for providing a safety strategy in a vehicle according to one aspect of the present disclosure.

FIG. 2 is a drawing illustrating an exemplary operation of an apparatus for providing a safety strategy in a vehicle according to one aspect of the present disclosure.

Referring to FIG. 2, when it is difficult to normally operate an autonomous system due to a failure of the autonomous system while the autonomous system is operated, the vehicle may generate a transition demand such that a driver of the vehicle controls the vehicle. When the driver does not respond to the transition demand during a specified time interval, the vehicle may activate an MRM. The vehicle may search for a shoulder on a road where it is traveling.

The vehicle may first activate a normal MRM. When the shoulder is not found on the road where the vehicle is traveling, the vehicle may control its stopping. For example, the vehicle may calculate a distance required until stopping and may calculate deceleration, thus controlling its stopping based on the calculated results.

When the shoulder is found on the road where the vehicle is traveling, the vehicle may control its stopping in the shoulder. For example, the vehicle may calculate an expected time $T_{LC}$ taken. For example, the expected time $T_{LC}$ taken may be calculated by multiplying the number of lanes from the lane where the vehicle is currently traveling to the shoulder by 6 seconds and may adding a time margin of 3 seconds to the multiplied value. When the expected time $T_{LC}$ taken is shorter than a specified time $T_{NormalMRM}$, the vehicle may initiate lane change control.

When the expected time $T_{LC}$ taken is longer than or equal to the specified time $T_{NormalMRM}$, the vehicle may activate an emergency MRM. The vehicle may change an operational condition of a lane change. The vehicle may calculate an expected time $T_{LC}$ taken again based on the changed operational condition. When the expected time $T_{LC}$ taken is shorter than a specified time $T_{EmergencyMRM}$, the vehicle may initiate lane change control. When the expected time $T_{LC}$ taken is longer than or equal to the specified time $T_{EmergencyMRM}$, the vehicle may control its stopping.

Figure 3:
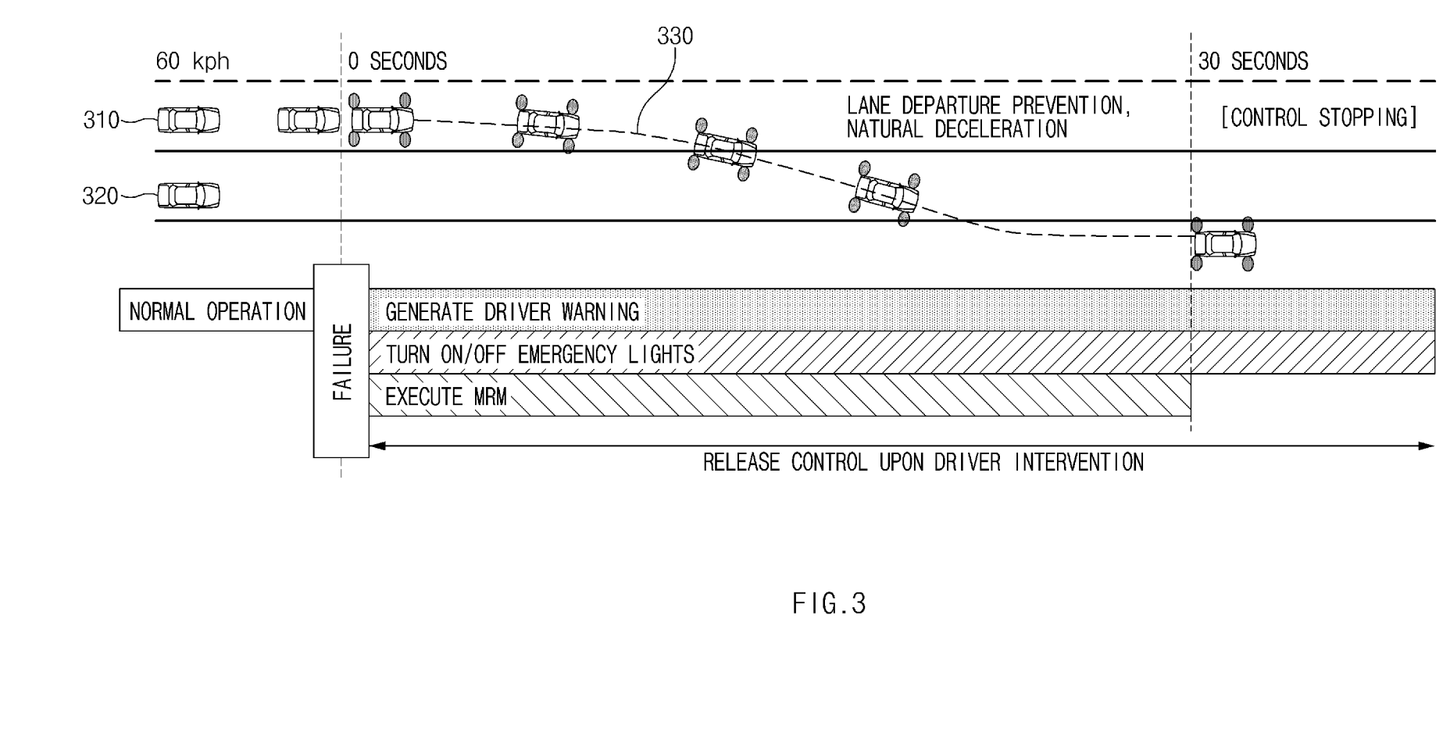
FIG. 3 is a drawing illustrating an exemplary operation of an apparatus for providing a safety strategy in a vehicle according to one aspect of the present disclosure.

FIG. 3 is a drawing illustrating an exemplary operation of an apparatus for providing a safety strategy in a vehicle according to one aspect of the present disclosure.

Referring to FIG. 3, when an MRM is initiated, a vehicle 310 may generate a route 330 which is toward a shoulder. The vehicle 310 may generate a driver warning and may turn on/off emergency lights. In an MRM situation, the vehicle 310 may adjust an operational condition of an automatic lane change.

For example, when a following vehicle 320 is sensed by a sensor of the vehicle 310, the vehicle 310 may determine that a sensor sensing distance condition is satisfied. When a critical distance calculated based on a speed of the vehicle 310 and a relative distance between the vehicle 310 and the following vehicle 320 is less than a distance between the vehicle 310 and the following vehicle 320, the vehicle 310 may determine that an operational distance condition is satisfied. When an operational speed calculated based on a speed of the following vehicle 320 and a distance between the vehicle 310 and the following vehicle 320 is slower than a speed of the vehicle 310, the vehicle 310 may determine that an operational speed condition is satisfied.

When the above-mentioned conditions are satisfied and when an expected time taken is shorter than a specified time, the vehicle 310 may perform lane change control toward the shoulder. When the vehicle 310 is moved to the shoulder, the vehicle 310 may control its stopping.

Figure 4:
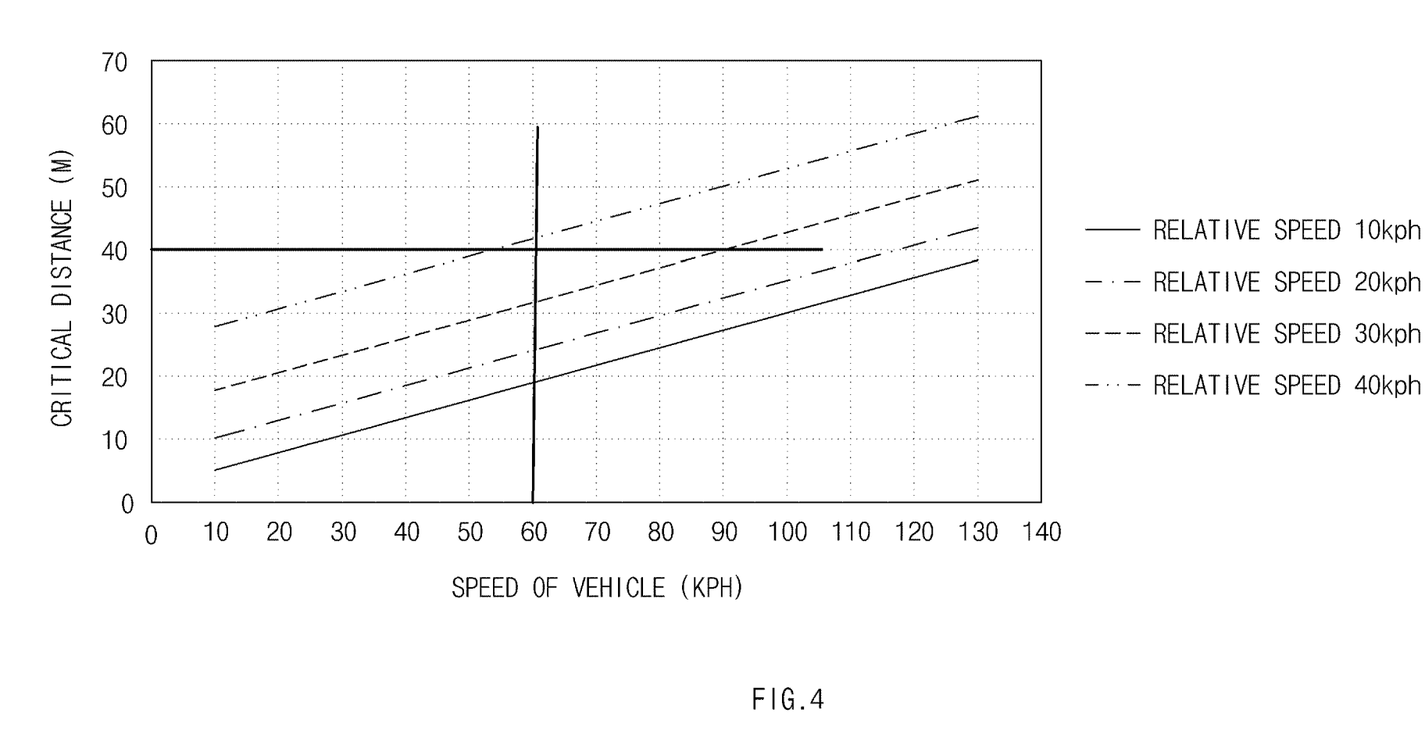
FIG. 4 is a drawing illustrating an exemplary operation of an apparatus for providing a safety strategy in a vehicle according to one aspect of the present disclosure.

FIG. 4 is a drawing illustrating an exemplary operation of an apparatus for providing a safety strategy in a vehicle according to one aspect of the present disclosure.

Referring to FIG. 4, a critical distance (an operational distance condition) may be adjusted based on a speed of the vehicle and a relative speed between the vehicle and a following vehicle. As shown in FIG. 4, the critical distance may be adjusted to increase as a speed of the vehicle increases and increase as a relative speed between the vehicle and the following vehicle increases. For example, when the speed of the vehicle is less than or equal to 60 kph, when the relative speed is less than or equal to 30 kph, and when the distance between the vehicle and the following vehicle is greater than or equal to 40 m, the operational distance condition may be satisfied.

Figure 5:
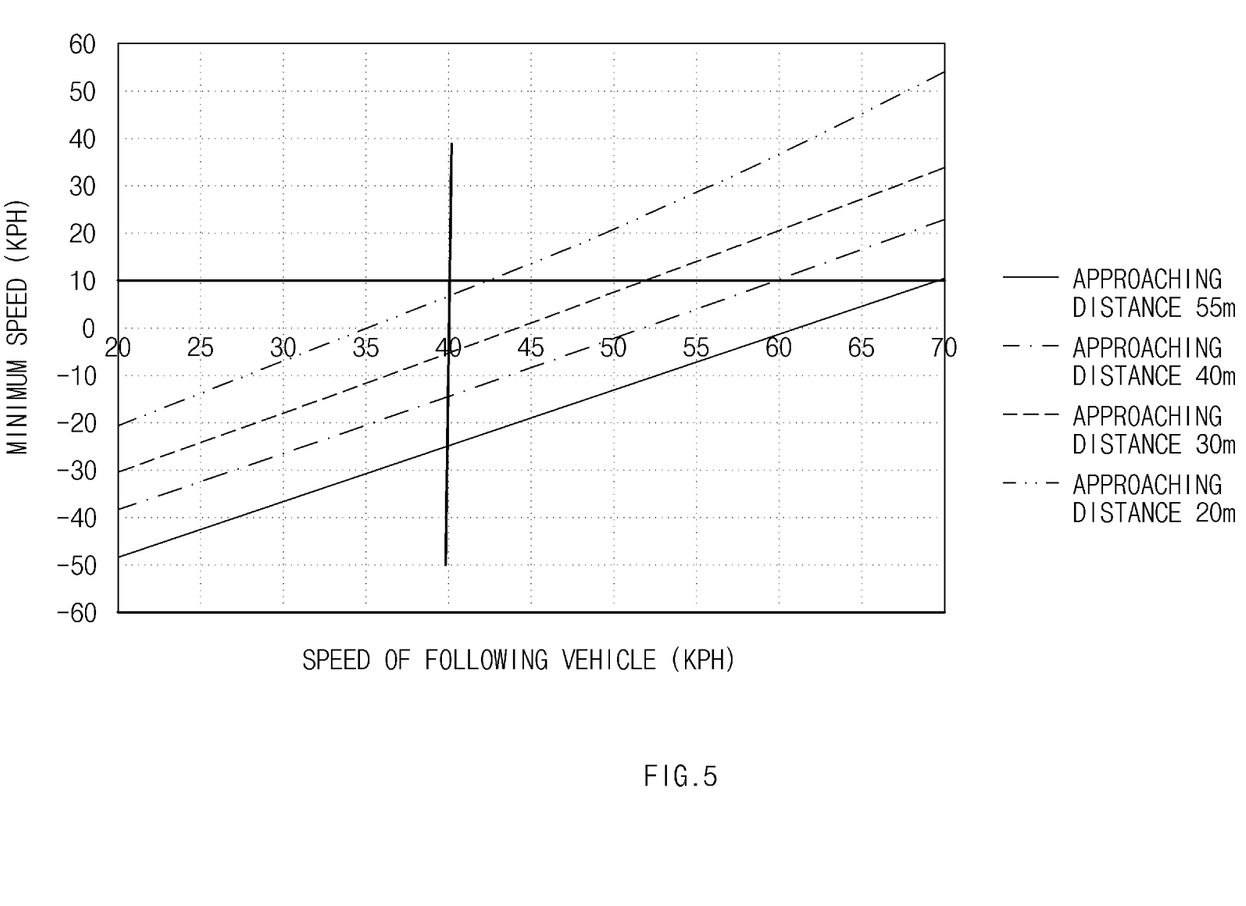
FIG. 5 is a drawing illustrating an exemplary operation of an apparatus for providing a safety strategy in a vehicle according to one aspect of the present disclosure.

FIG. 5 is a drawing illustrating an exemplary operation of an apparatus for providing a safety strategy in a vehicle according to one aspect of the present disclosure.

Referring to FIG. 5, a reduced or minimum speed (an operational speed condition) may be adjusted based on a speed of a following speed and a distance between the vehicle and the following speed. As shown in FIG. 5, the reduced or minimum speed may be adjusted to increase as the following vehicle increases in speed and decrease as a distance between the vehicle and the following vehicle increases. For example, when the speed of the following vehicle is less than or equal to 40 kph, when the distance between the vehicle and the following vehicle is greater than or equal to 20 m, and when the speed of the vehicle is greater than or equal to 10 kph, the operational speed condition may be satisfied.

Figure 6:
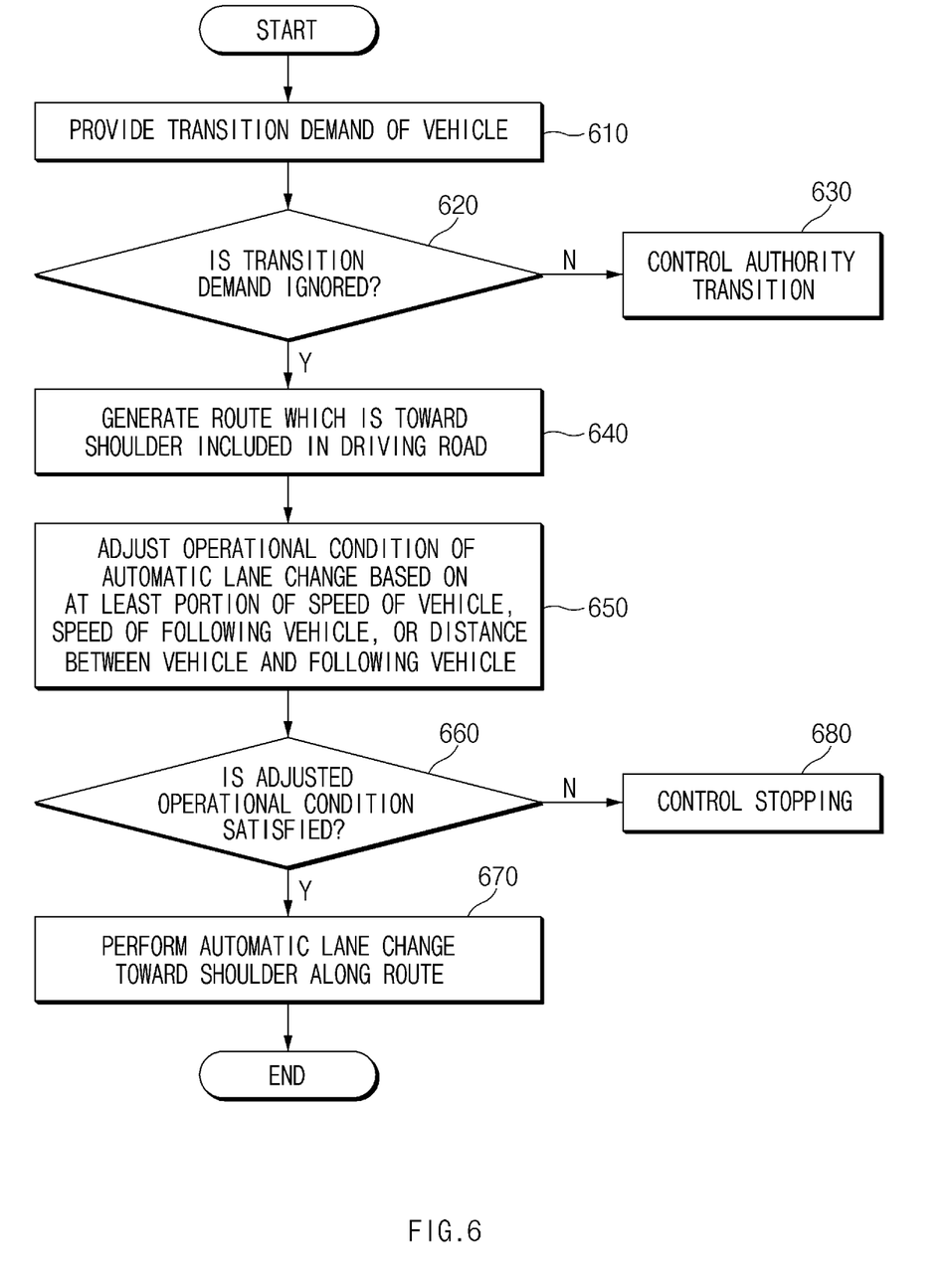
FIG. 6 is a flowchart illustrating a method for providing a safety strategy in a vehicle according to one aspect of the present disclosure.

FIG. 6 is a flowchart illustrating a method for providing a safety strategy in a vehicle according to one aspect of the present disclosure.

Hereinafter, it is assumed that a vehicle including an apparatus 100 for providing a safety strategy in FIG. 1 performs a process of FIG. 6. Furthermore, in a description of FIG. 6, an operation described as being performed by the vehicle may be understood as being controlled by a control circuit 130 of the apparatus 100 for providing the safety strategy.

Referring to FIG. 6, in operation 610, the vehicle may provide a transition demand of the vehicle to its driver. For example, the vehicle may output the transition demand to hand over control authority to the driver.

In operation 620, the vehicle may determine whether the transition demand is ignored. For example, when the driver does not approve the transition demand during a specified time, the vehicle may determine that the transition demand is ignored.

When the transition demand is approved, in operation 630, the vehicle may hand over control authority to the driver. For example, the vehicle may release the control by an autonomous system.

When the transition demand is ignored, in operation 640, the vehicle may generate a route which is toward a shoulder included in a road where it is traveling. For example, the vehicle may execute a strategy, as one of MRMs, for moving the vehicle to the shoulder.

In operation 650, the vehicle may adjust an operational condition of an automatic lane change based on at least a portion of a speed of the vehicle, a speed of a following vehicle, or a distance between the vehicle and the following vehicle. For example, a predetermined sensor sensing distance condition may be satisfied when a distance sensible by a sensor of the vehicle is greater than a specified distance. After the vehicle changes the predetermined sensor sensing distance condition, when the following vehicle is sensed by the sensor, the vehicle may determine that the sensor sensing distance condition is satisfied. An operational distance condition may be calculated based on a speed of the vehicle and a relative speed between the vehicle and the following vehicle. The operational speed condition may be calculated based on a speed of the following vehicle and a distance between the vehicle and the following vehicle.

In operation 660, the vehicle may determine whether the adjusted operational condition is satisfied. When the adjusted operational condition is satisfied, in operation 670, the vehicle may perform an automatic lane change toward the shoulder along the generated route. When the adjusted operational condition is not satisfied, in operation 680, the vehicle may control its stopping in the lane where the vehicle is traveling.

Figure 7:
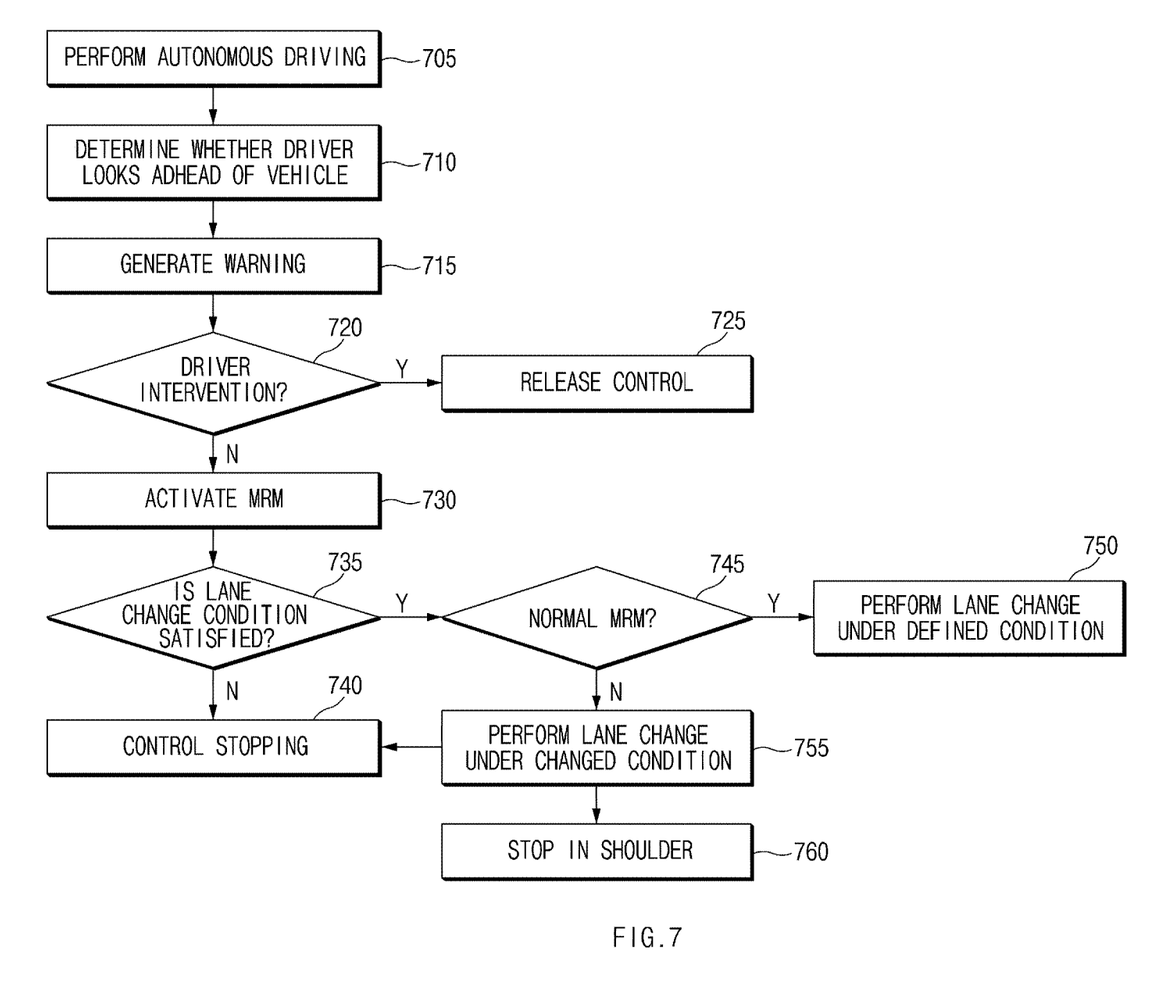
FIG. 7 is a flowchart illustrating a method for providing a safety strategy in a vehicle according to one aspect of the present disclosure.

FIG. 7 is a flowchart illustrating a method for providing a safety strategy in a vehicle according to one aspect of the present disclosure.

Hereinafter, it is assumed that a vehicle including an apparatus 100 for providing a safety strategy in FIG. 1 performs a process of FIG. 7. Furthermore, in a description of FIG. 7, an operation described as being performed by the vehicle may be understood as being controlled by a control circuit 130 of the apparatus 100 for providing the safety strategy.

Referring to FIG. 7, in operation 705, the vehicle may perform autonomous driving. In operation 710, the vehicle may determine whether its driver looks ahead of the vehicle. When the driver does not look ahead of the vehicle, in operation 715, the vehicle may generate a warning. In operation 720, the vehicle may determine whether the driver intervenes. When control authority is handed over to the driver after the driver intervenes, in operation 725, the vehicle may release the autonomous control.

When the control authority is not handed over to the driver because the driver does not intervene, in operation 730, the vehicle may activate an MRM. In operation 735, the vehicle may determine whether an operational condition of a lane change is satisfied. When the condition is not satisfied, in operation 740, the vehicle may control its stopping. When the condition is satisfied, in operation 745, the vehicle may determine whether it is able to perform a normal MRM. When it is able to perform the normal MRM, in operation 750, the vehicle may perform a lane change under a defined condition.

When it is unable to perform the normal MRM, in operation 755, the vehicle may change the operational condition of the lane change and may perform a lane change under the changed operational condition. In operation 760, the vehicle may control its stopping in a shoulder.

Figure 8:
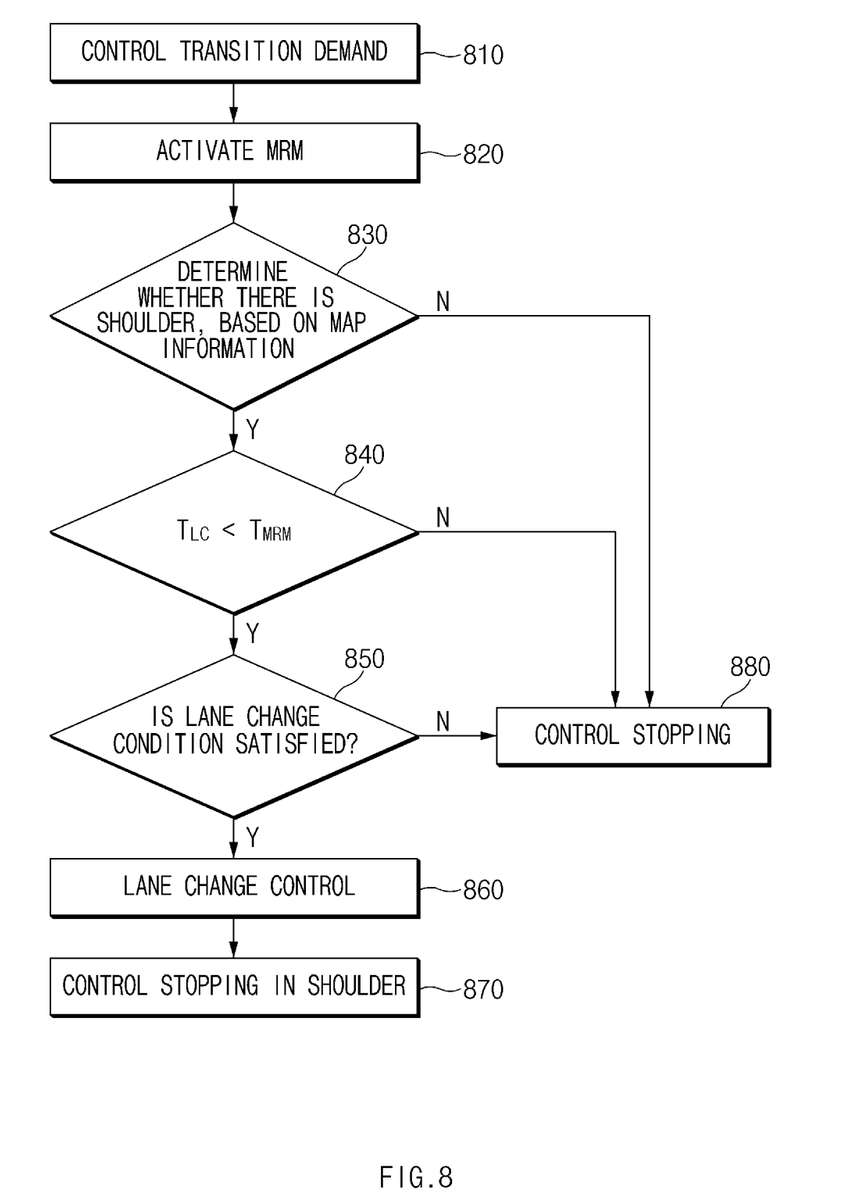
FIG. 8 is a flowchart illustrating a method for providing a safety strategy in a vehicle according to one aspect of the present disclosure.

FIG. 8 is a flowchart illustrating a method for providing a safety strategy in a vehicle according to one aspect of the present disclosure.

Hereinafter, it is assumed that a vehicle including an apparatus 100 for providing a safety strategy in FIG. 1 performs a process of FIG. 8. Furthermore, in a description of FIG. 8, an operation described as being performed by the vehicle may be understood as being controlled by a control circuit 130 of the apparatus 100 for providing the safety strategy.

Referring to FIG. 8, in operation 810, the vehicle may provide a transition demand to its driver. When the driver does not respond to the transition demand during a specified time interval, in operation 820, the vehicle may activate an MRM. In operation 830, the vehicle may determine whether there is a shoulder, based on map information. When there is the shoulder, in operation 840, the vehicle may determine whether an expected time $T_{LC}$ taken to move to the shoulder is shorter than a specified time $T_{MRM}$. When the expected time $T_{LC}$ is shorter than the specified time $T_{MRM}$, in operation 850, the vehicle may determine whether a lane change condition is satisfied. When the lane change condition is satisfied, in operation 860, the vehicle may perform lane change control. In operation 870, the vehicle may control its stopping in the shoulder. When there is no the shoulder, when the expected time $T_{LC}$ is longer than or equal to the specified time $T_{MRM}$, or when the lane change condition is not satisfied, in operation 880, the vehicle may control its stopping without a lane change.

Figure 9:
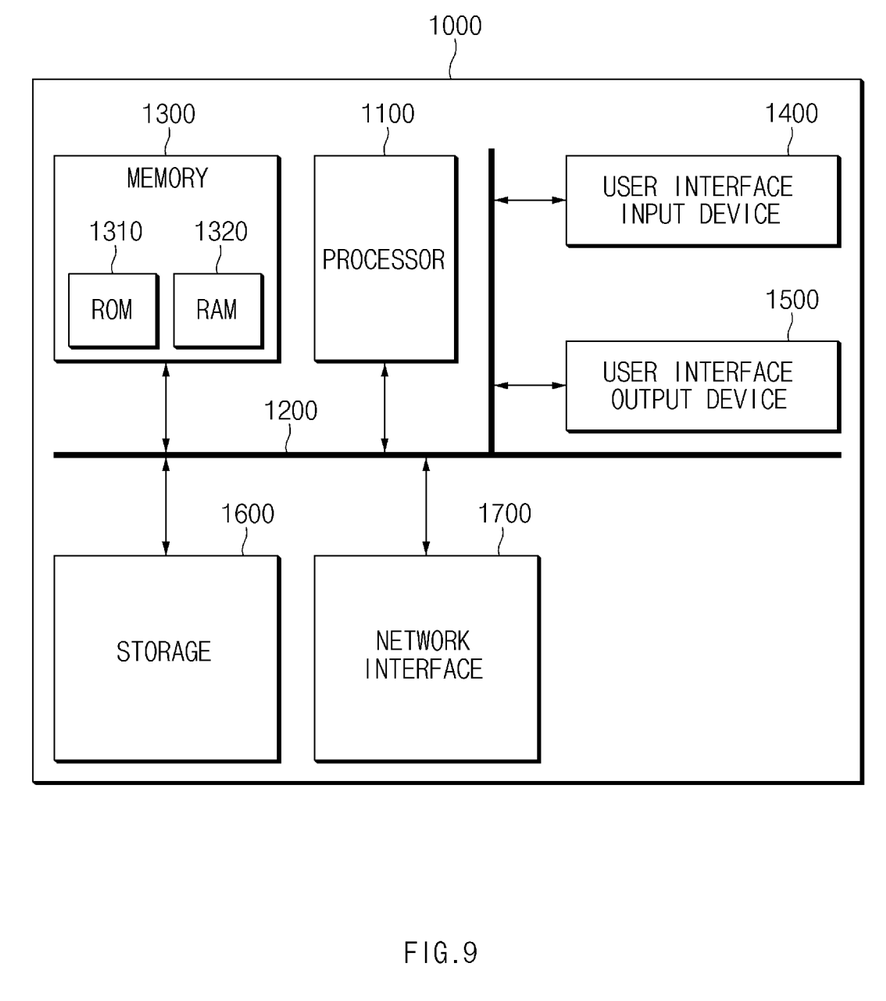
FIG. 9 is a block diagram illustrating a configuration of a computing system according to one aspect of the present disclosure.

FIG. 9 is a block diagram illustrating a configuration of a computing system according to one aspect of the present disclosure.

Referring to FIG. 9, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for performing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus for providing the safety strategy in the vehicle according to one aspect of the present disclosure may provide a safety strategy capable of providing for the safety of the driver in a situation where a predetermined operational condition is not satisfied, by adjusting an operational condition of an automatic lane change in a critical situation.

In addition, various effects directly or indirectly ascertained through the present disclosure may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure.

What is claimed is:

1. An apparatus for providing a safety strategy in a vehicle, the apparatus comprising:
   a sensor configured to sense information about an outside of the vehicle;
   a memory storing road information; and
   a control circuit configured to be electrically connected with the sensor and the memory,
   wherein the control circuit is configured to:
      generate a route which is toward a shoulder included in a road where the vehicle is traveling, when a transition demand of the vehicle is ignored;
      adjust an operational condition of an automatic lane change based on at least a portion of a speed of the vehicle, a speed of a following vehicle in a target lane of the route, or a distance between the vehicle and the following vehicle; and
      perform the automatic lane change toward the shoulder along the route, when the adjusted operational condition is satisfied.

2. The apparatus of claim 1, wherein the control circuit is configured to:
   generate the route, when a driver of the vehicle does not respond to the transition demand during a specified time interval after the transition demand occurs.

3. The apparatus of claim 1, wherein the control circuit is configured to:
   determine whether the shoulder is included in the road, based on the road information; and
   generate the route, when the shoulder is included in the road.

4. The apparatus of claim 1, wherein the control circuit is configured to:
   control stopping in the shoulder, when the vehicle enters the shoulder.

5. The apparatus of claim 1, wherein the operational condition comprises a sensor sensing distance condition, an operational distance condition, and an operational speed condition.

6. The apparatus of claim 5, wherein the control circuit is configured to:
   adjust the operational condition to determine that the sensor sensing distance condition is satisfied when the following vehicle is sensed by the sensor.

7. The apparatus of claim 5, wherein the operational distance condition is adjusted based on a speed of the vehicle and a relative speed between the vehicle and the following vehicle.

8. The apparatus of claim 5, wherein the operational speed condition is adjusted based on a speed of the following vehicle and a distance between the vehicle and the following vehicle.

9. The apparatus of claim 1, wherein the control circuit is configured to:
adjust the operational condition, when a predetermined operational condition is not satisfied.

10. The apparatus of claim 1, wherein the control circuit is configured to:
calculate an expected time taken to enter the shoulder; and
adjust the operational condition, when the expected time is longer than a specified time.

11. A method for providing a safety strategy in a vehicle, the method comprising:
generating, by a control circuit, a route which is toward a shoulder included in a road where the vehicle is traveling, when a transition demand of the vehicle is ignored;
adjusting, by the control circuit, an operational condition of an automatic lane change based on information sensed by a sensor in electrical connection with the control circuit, the information comprising at least a portion of a speed of the vehicle, a speed of a following vehicle in a target lane of the route, or a distance between the vehicle and the following vehicle; and
performing, by the control circuit, the automatic lane change toward the shoulder along the route, when the adjusted operational condition is satisfied.

12. The method of claim 11, wherein the generating comprises:
generating the route, when a driver of the vehicle does not respond to the transition demand during a specified time interval after the transition demand occurs.

13. The method of claim 11, wherein the generating comprises:
determining whether the shoulder is included in the road, based on road information; and
generating the route, when the shoulder is included in the road.

14. The method of claim 11, further comprising:
controlling stopping in the shoulder, when the vehicle enters the shoulder.

15. The method of claim 11, wherein the operational condition comprises sensing, by the sensor, at least one of a distance condition, an operational distance condition, or an operational speed condition.

16. The method of claim 15, wherein the adjusting comprises:
adjusting the operational condition to determine that the sensor sensing distance condition is satisfied when the following vehicle is sensed by a sensor of the vehicle.

17. The method of claim 15, wherein the operational distance condition is adjusted based on a speed of the vehicle and a relative speed between the vehicle and the following vehicle.

18. The method of claim 15, wherein the operational speed condition is adjusted based on a speed of the following vehicle and a distance between the vehicle and the following vehicle.

19. The method of claim 11, wherein the adjusting comprises:
adjusting the operational condition, when a predetermined operational condition is not satisfied.

20. The method of claim 11, wherein the adjusting comprises:
calculating an expected time taken to enter the shoulder; and
adjusting the operational condition, when the expected time is longer than a specified time.

* * * * *